US011306503B1

(12) United States Patent
Cupp, Jr.

(10) Patent No.: US 11,306,503 B1
(45) Date of Patent: Apr. 19, 2022

(54) FENCE POST LEVELING BRACKET ASSEMBLY AND SYSTEM AND METHOD FOR USE OF SAME

(71) Applicant: Mickey D. Cupp, Jr., Fate, TX (US)

(72) Inventor: Mickey D. Cupp, Jr., Fate, TX (US)

(*) Notice: Subject to any disclaimer, the term of this patent is extended or adjusted under 35 U.S.C. 154(b) by 0 days.

(21) Appl. No.: 17/532,864

(22) Filed: Nov. 22, 2021

Related U.S. Application Data

(60) Provisional application No. 63/117,288, filed on Nov. 23, 2020.

(51) Int. Cl.
*E04H 17/00* (2006.01)
*F16B 43/02* (2006.01)
*E04H 17/14* (2006.01)

(52) U.S. Cl.
CPC ............ *E04H 17/009* (2021.01); *F16B 43/02* (2013.01); *E04H 17/143* (2013.01)

(58) Field of Classification Search
CPC ....... E04H 17/00; E04H 17/009; E04H 17/14; E04H 17/20; E04H 17/22; E04H 17/23; E04H 12/22; E04H 12/2207; E04H 12/2215; E04H 12/2223; E04H 12/223; E04H 12/2253; E04H 12/2269; E04H 12/2284; F16B 43/02
See application file for complete search history.

(56) References Cited

U.S. PATENT DOCUMENTS

| 382,992 A | 5/1888 | Lindley |
| 981,610 A * | 1/1911 | Bolsterli ............. E04B 1/34347 52/149 |
| 3,645,057 A * | 2/1972 | Kaplan ............... E04H 12/2284 403/164 |
| 3,785,097 A * | 1/1974 | Seymour ................. E04G 21/14 52/223.7 |
| 3,809,346 A | 5/1974 | Jackson |
| 3,838,547 A | 10/1974 | Meisberger |

(Continued)

FOREIGN PATENT DOCUMENTS

DE 2725057 A1 * 12/1978
EP 2159354 A1 * 3/2010 ............ E01F 8/0023

(Continued)

OTHER PUBLICATIONS

Altron. (n.d.). Welcome to Altron—specialists in CCTV camera mounting; Product Support—Installation Methods. Altron. Retrieved Nov. 22, 2021, from http://www.altron.co.uk/.

*Primary Examiner* — Jonathan P Masinick
(74) *Attorney, Agent, or Firm* — Scott T. Griggs; Griggs Bergen LLP

(57) ABSTRACT

A fence post leveling bracket assembly and system and method for use of the same are disclosed. In one embodiment of the vertically supporting assembly, an upper fence post bracket and a lower fence post bracket having a reference placement where an upper base plate of the upper fence post bracket is parallel to a lower base plate of the lower fence post bracket. The upper fence post bracket and the lower fence post bracket also have deviated placements where the upper base plate is nonparallel to the lower base plate. In both the reference placement and the deviated placements, adjustable vertical drift rods span a cavity between the upper base plate and the lower base plate. Lean in a fence may be corrected by selectively adjusting the adjustable vertical drift rods.

20 Claims, 11 Drawing Sheets

(56) References Cited

U.S. PATENT DOCUMENTS

| | | | |
|---|---|---|---|
| 4,349,181 A | 9/1982 | Asher et al. | |
| 4,926,592 A * | 5/1990 | Nehls | E01F 9/681 |
| | | | 40/607.05 |
| 5,594,669 A | 1/1997 | Heger | |
| 5,855,443 A * | 1/1999 | Faller | E01F 9/635 |
| | | | 248/548 |
| 5,906,466 A * | 5/1999 | Eandi | E04F 13/0837 |
| | | | 411/537 |
| 6,273,390 B1 | 8/2001 | Meyer | |
| 6,526,722 B1 | 3/2003 | Pangburn | |
| 6,722,821 B1 * | 4/2004 | Perko | E02D 5/801 |
| | | | 405/249 |
| 7,004,683 B1 * | 2/2006 | Rupiper | E02D 5/56 |
| | | | 52/165 |
| 7,533,506 B2 | 5/2009 | Platt | |
| 8,407,967 B2 * | 4/2013 | Brindle, Jr. | E04C 3/005 |
| | | | 52/854 |
| 8,528,275 B2 | 9/2013 | Paananen | |
| 8,568,055 B2 | 10/2013 | Marques Lito Velez Grilo | |
| 8,826,629 B1 * | 9/2014 | Brindle | E04C 3/005 |
| | | | 52/855 |
| 9,051,706 B1 * | 6/2015 | Ludwig | E02D 7/22 |
| 9,394,717 B2 | 7/2016 | Paananen | |
| 9,422,687 B2 * | 8/2016 | Reinert | E04H 12/2215 |
| 9,850,676 B2 | 12/2017 | Hamilton | |
| 9,945,145 B2 * | 4/2018 | Faries | E04H 12/2269 |
| 10,301,838 B1 * | 5/2019 | Karakas | E04B 1/167 |
| 10,378,232 B2 | 8/2019 | Voin | |
| 10,619,374 B1 * | 4/2020 | Wong | E04H 12/187 |
| 10,982,460 B2 | 4/2021 | Reusing | |
| 11,002,435 B2 | 5/2021 | Oliver et al. | |
| 2005/0008457 A1 * | 1/2005 | Winker | F16B 43/02 |
| | | | 411/533 |
| 2010/0272505 A1 | 10/2010 | Daniel | |
| 2012/0326001 A1 | 12/2012 | Suutarinen | |
| 2013/0061453 A1 * | 3/2013 | Rosendahl | E04H 5/04 |
| | | | 29/428 |
| 2014/0115978 A1 * | 5/2014 | Fairbairn | E04H 12/2276 |
| | | | 52/298 |
| 2020/0340649 A1 * | 10/2020 | Oliver | F21V 21/02 |
| 2021/0285253 A1 | 9/2021 | Wood | |

FOREIGN PATENT DOCUMENTS

| | | | | |
|---|---|---|---|---|
| EP | 1887166 | | 4/2013 | |
| EP | 3258035 | | 12/2017 | |
| GB | 2417500 | | 4/2009 | |
| GB | 2460271 A | * | 11/2009 | E04H 12/2215 |
| GB | 2493032 | | 1/2013 | |
| GB | 2568312 | | 5/2019 | |
| JP | 2008196235 | | 8/2008 | |
| JP | 5965690 | | 8/2016 | |
| KR | 102112575 | | 5/2020 | |
| NO | 324580 | | 11/2007 | |
| NO | 343828 | | 6/2016 | |
| WO | 2007084009 | | 7/2007 | |

\* cited by examiner

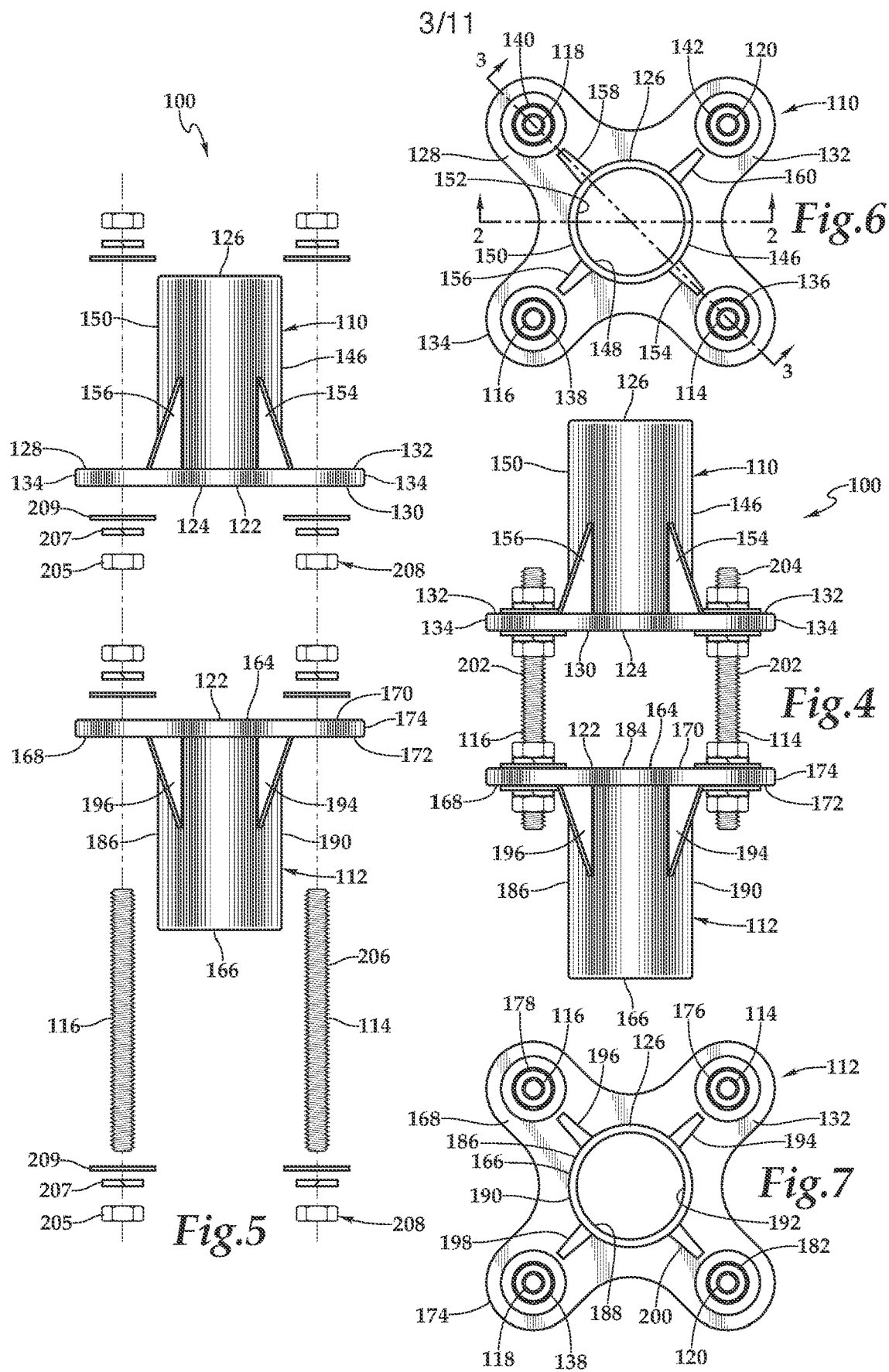

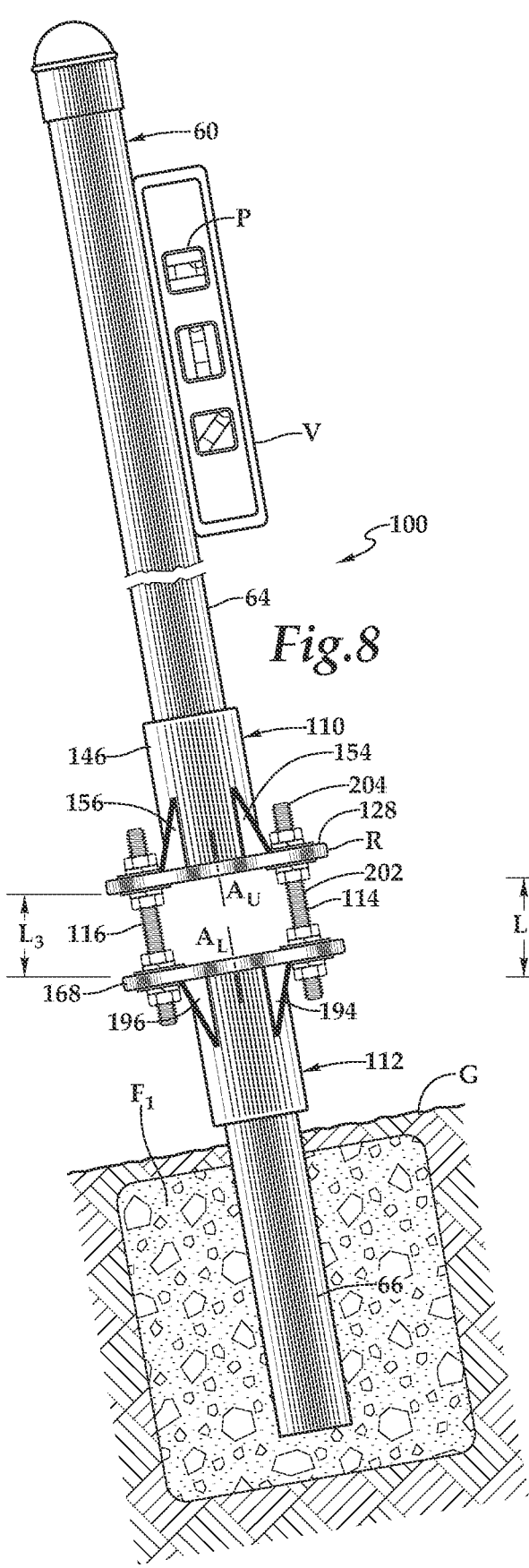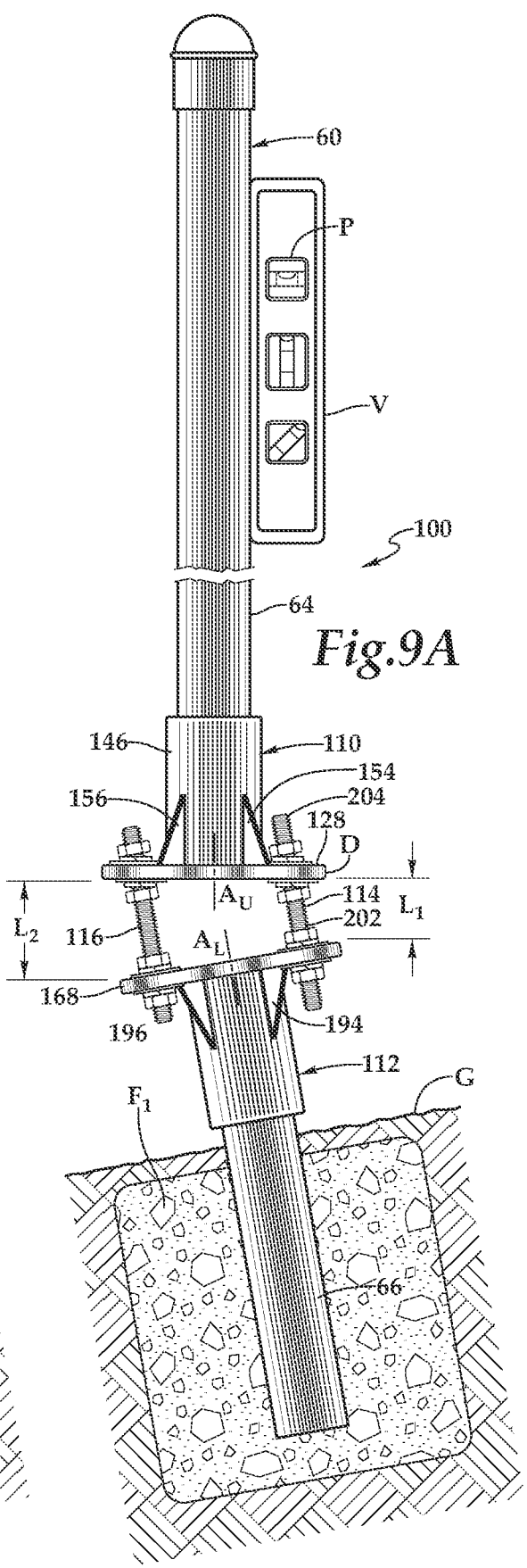

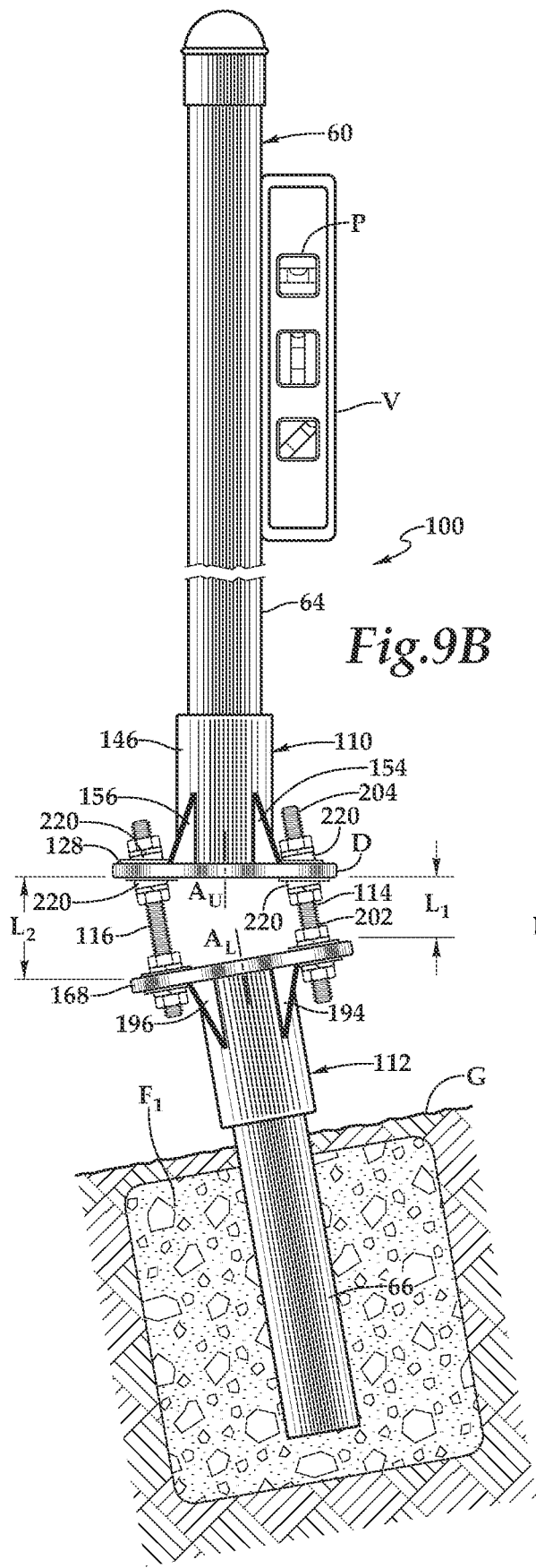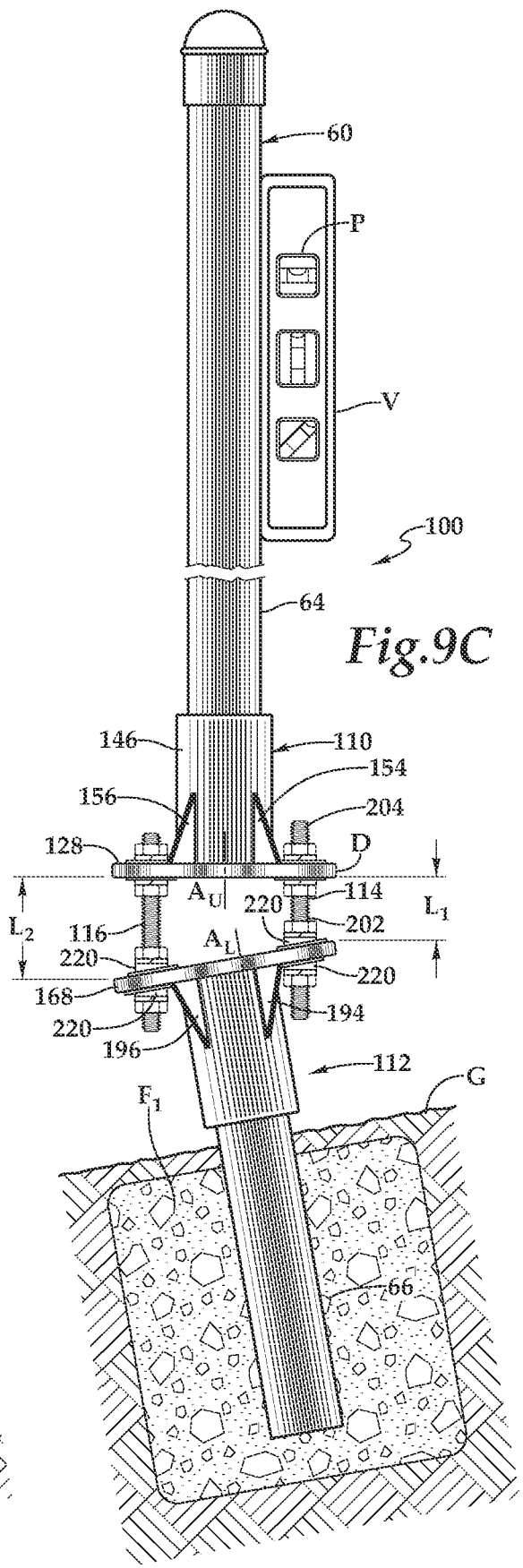

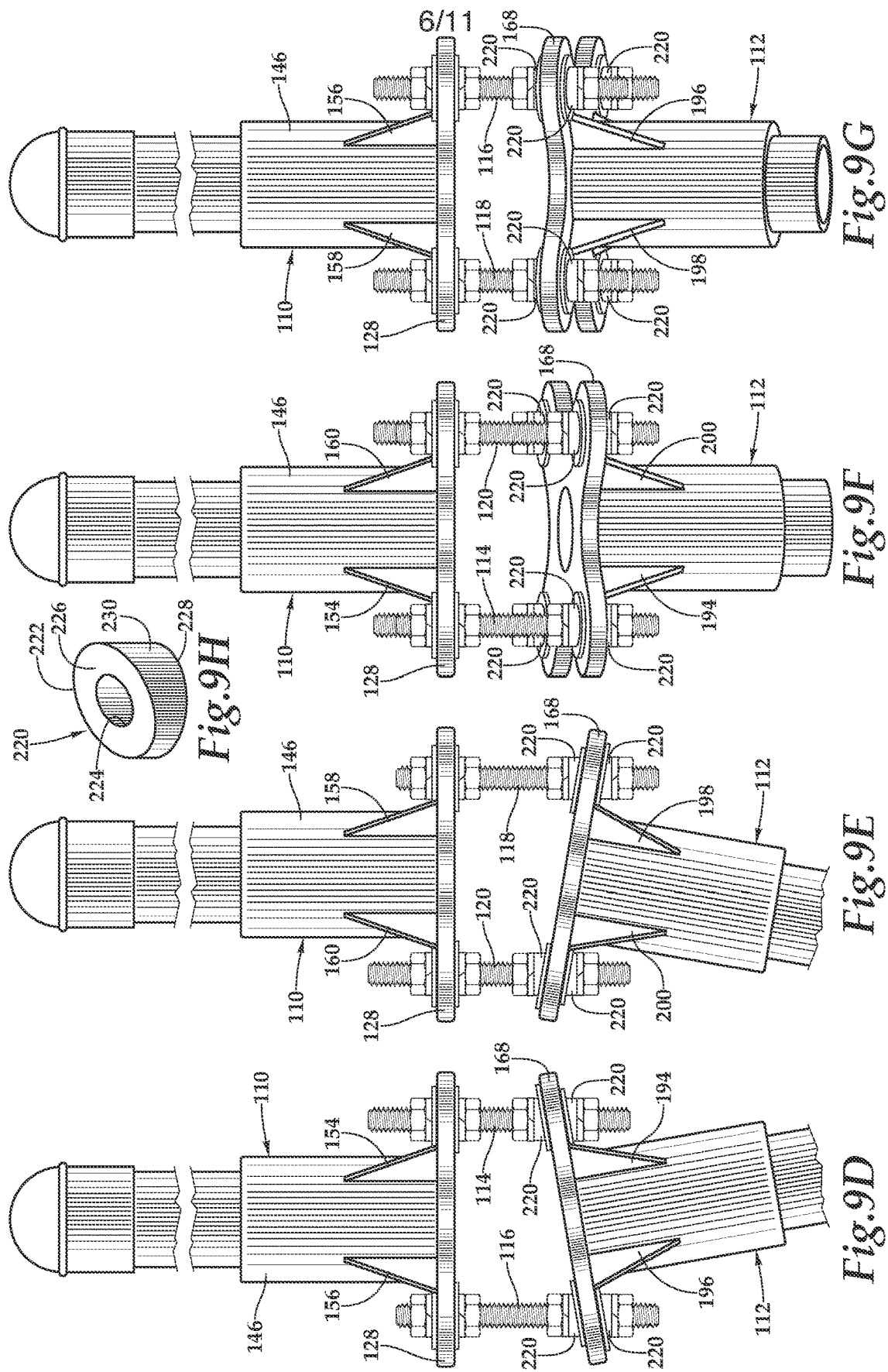

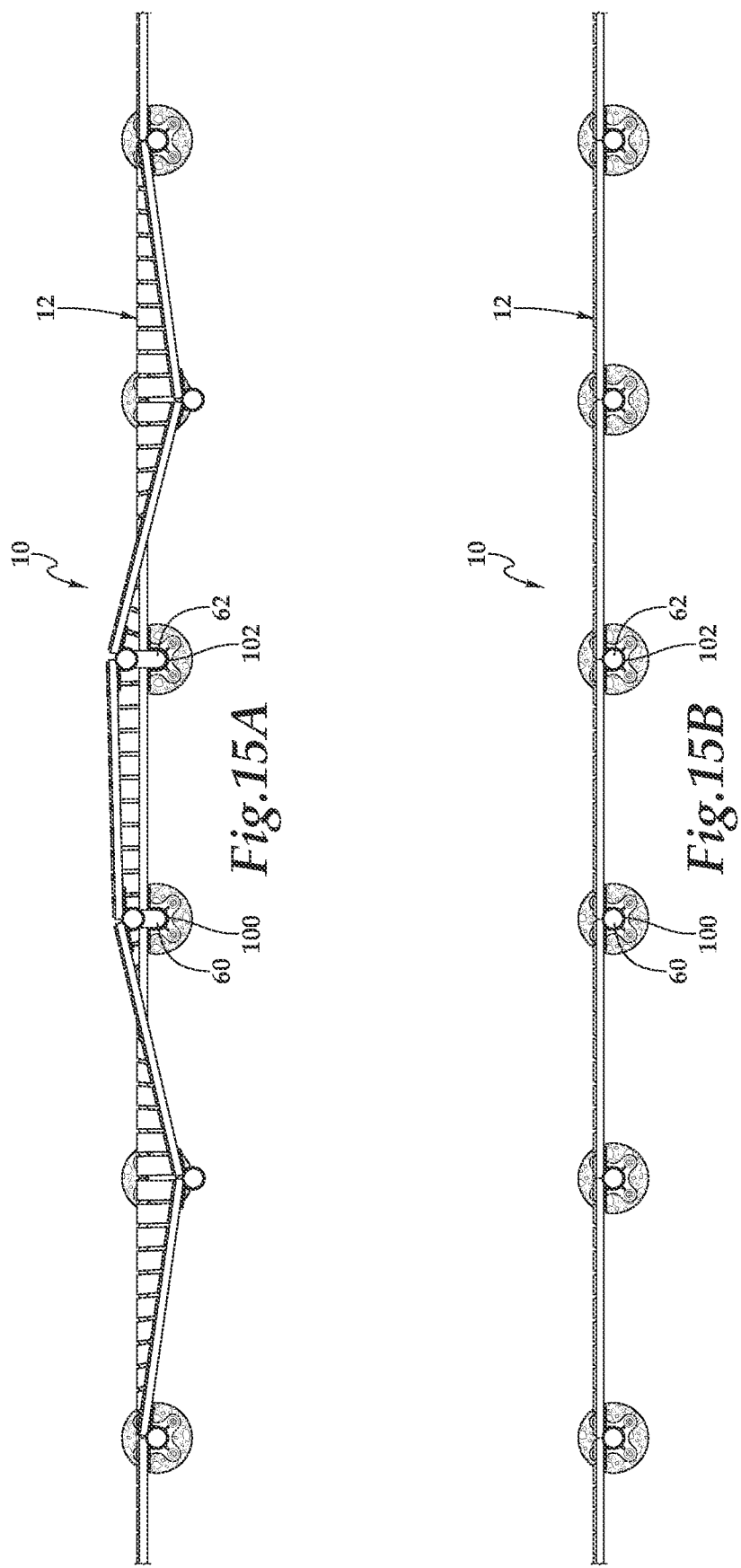

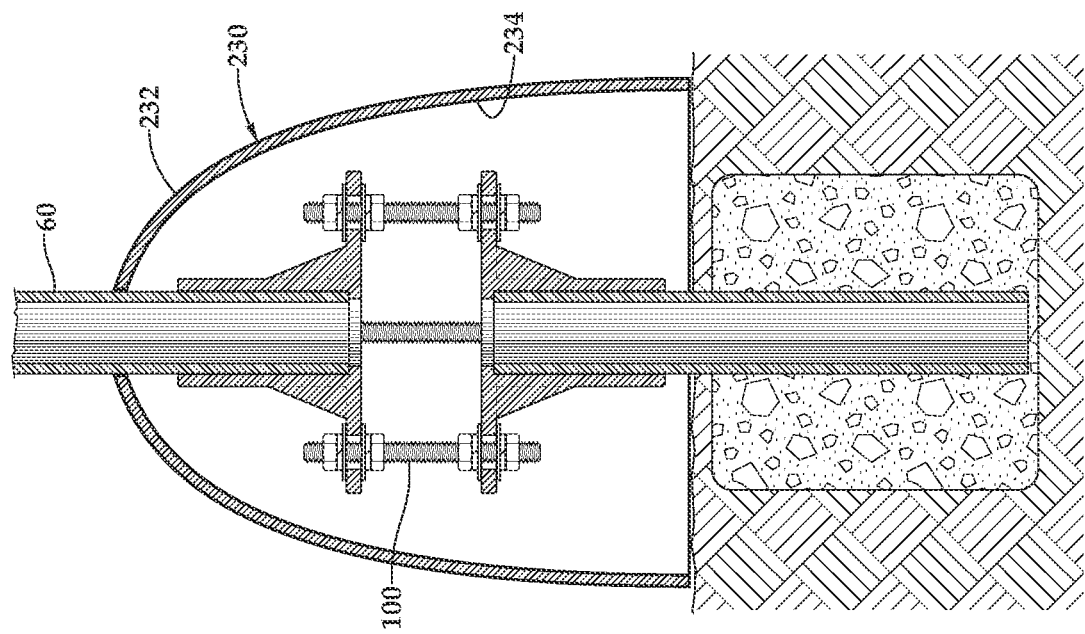
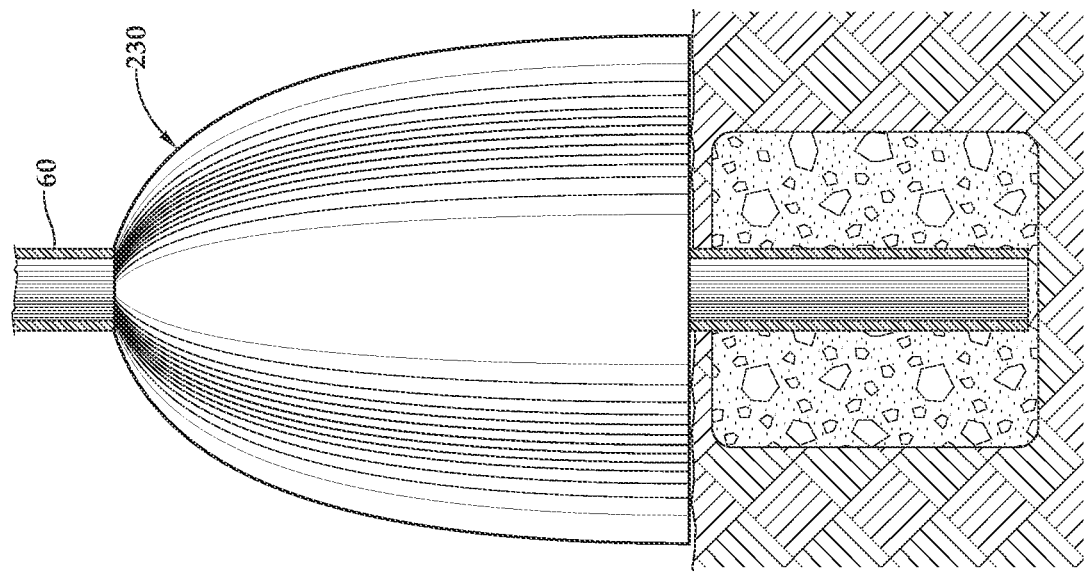

US 11,306,503 B1

FENCE POST LEVELING BRACKET ASSEMBLY AND SYSTEM AND METHOD FOR USE OF SAME

PRIORITY STATEMENT & CROSS-REFERENCE TO RELATED APPLICATIONS

This application claims priority from U.S. Patent Application No. 63/117,288, entitled "Fence Post Anchoring Assembly and System and Method for Use of Same" and filed on Nov. 23, 2020, in the name of Mickey D. Cupp JR; which is hereby incorporated by reference, in entirety, for all purposes.

TECHNICAL FIELD OF THE INVENTION

This invention relates, in general, to fences that mark a perimeter and, in particular, to a fence post leveling bracket assembly and a system and method for use of the same for a fence having posts vertically supported in the ground.

BACKGROUND OF THE INVENTION

Fences are a popular choice to mark a perimeter, keep animals and children safe, and add privacy or beauty, for example. A fence post serves as a vertical support for a strong, structurally sound fence that will stand against precipitation, high winds, excess ground moisture, and draught. Over time, natural elements can cause even a structurally sound fence to lean as the part of the fence post below ground, whether embedded in concrete or not, often shifts due to ground movement. Technological improvements are needed to mitigate and correct fence lean.

SUMMARY OF THE INVENTION

It would be advantageous to achieve a fence post leveling bracket assembly and a system and method for use of the same for a fence having posts vertically supported in the ground, where the fence post leveling bracket assembly adjusts portions of the fence to maintain a level, plumb, or straight position, as required. It would also be desirable to enable a mechanical-based solution that would be non-encumbering and allow the correction of lean over time. It would further be desirable to enable an electronics-based and internet-of-things-based solution that would permit remote monitoring of fence lean. To better address one or more of these concerns, in one aspect of the invention, a fence post leveling bracket assembly and a system and method for use of the same for a fence having posts vertically supported in the ground is disclosed. As will be appreciated from the discussion below, in some embodiments, the fence post leveling bracket assembly may be utilized within the posts of the fence. In one embodiment of the fence post leveling bracket assembly, an upper fence post bracket and a lower fence post bracket have a reference placement where an upper base plate of the upper fence post bracket is parallel to a lower base plate of the lower fence post bracket. The upper fence post bracket and the lower fence post bracket also have deviated placements where the upper base plate is nonparallel to the lower base plate. In both the reference placement and the deviated placements, adjustable vertical drift rods, which may number four (4) in some implementations, span a cavity between the upper base plate and the lower base plate. Lean in a fence may be corrected intra-fence post, without disturbing the foundation, by selectively adjusting the adjustable vertical drift rods.

In another embodiment, a fencing system includes a fence having fence panels with each of the fence panels including vertically spaced runners. Each of the vertically spaced runners is substantially horizontal to the ground. Each of the fence panels includes adjacent fence pickets that are vertically oriented and secured to the vertically spaced runners. Further, each of the fence panels includes two horizontally spaced fence posts. Each of the horizontally spaced fence posts includes a fence post leveling bracket assembly for a fence having posts vertically supported in the ground.

In a still further embodiment, a fence post bracket system for a fence having posts vertically supported in the ground is presented. A fence post leveling bracket assembly is provided for the fence post. A monitoring unit is secured to the fence post. The monitoring unit includes a housing securing a processor, lean circuitry, a wireless transceiver, memory, and storage therein. A busing architecture communicatively interconnects the processor, the lean circuitry, the wireless transceiver, the memory, and the storage. The lean circuitry monitors the lean of the fence post and responsive to detecting a lean, sending a status signal. These and other aspects of the invention will be apparent from and elucidated with reference to the embodiments described hereinafter.

BRIEF DESCRIPTION OF THE DRAWINGS

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

For a more complete understanding of the features and advantages of the present invention, reference is now made to the detailed description of the invention along with the accompanying figures in which corresponding numerals in the different figures refer to corresponding parts and in which:

FIG. 4 is a front perspective view of the fence post leveling bracket assembly depicted in FIG. 2;

FIG. 5 is an exploded view of the fence post leveling bracket assembly depicted in FIG. 2;

FIG. 6 is a top elevation view of a portion of the fence post leveling bracket assembly depicted in FIG. 2;

FIG. 7 is a bottom elevation view of a portion of the fence post leveling bracket assembly depicted in FIG. 2;

FIG. 8 depicts a front elevation view, in partial cross-section, of one operational embodiment of the fence post leveling bracket assembly depicted in FIG. 2;

FIG. 9A depicts a front elevation view, in partial cross-section, of a further operational embodiment of the fence post leveling bracket assembly depicted in FIG. 2;

FIG. 9B depicts a front elevation view, in partial cross-section, of a further operational embodiment of the fence post leveling bracket assembly depicted in FIG. 2;

FIG. 9C depicts a front elevation view, in partial cross-section, of a further operational embodiment of the fence post leveling bracket assembly depicted in FIG. 2;

FIG. 9D depicts a front elevation view of the fence post leveling bracket assembly depicted in FIG. 9C;

FIG. 9E depicts a rear elevation view of the fence post leveling bracket assembly depicted in FIG. 9D;

FIG. 9F depicts a lateral elevation view of the fence post leveling bracket assembly depicted in FIG. 9D;

FIG. 9G depicts another lateral elevation view of the fence post leveling bracket assembly depicted in FIG. 9D;

FIG. 9H depicts a perspective view of one component of the fence post leveling bracket assembly depicted in FIG. 9D;

FIG. 15A is a top plan view of the fencing system depicted in FIG. 14 prior to fence lean mitigation; and FIG. 15B is a top plan view of the fencing system depicted in FIG. 14 and FIG. 15A, following mitigation of fence lean;

FIG. 16A is a lateral-offset elevation view of the fence post leveling bracket assembly depicted in FIG. 3 protected by a cover assembly; and FIG. 16B is a lateral-offset elevation view, in cross-section, of the fence post leveling bracket assembly depicted in FIG. 3 protected by the cover assembly first introduced in FIG. 16A.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
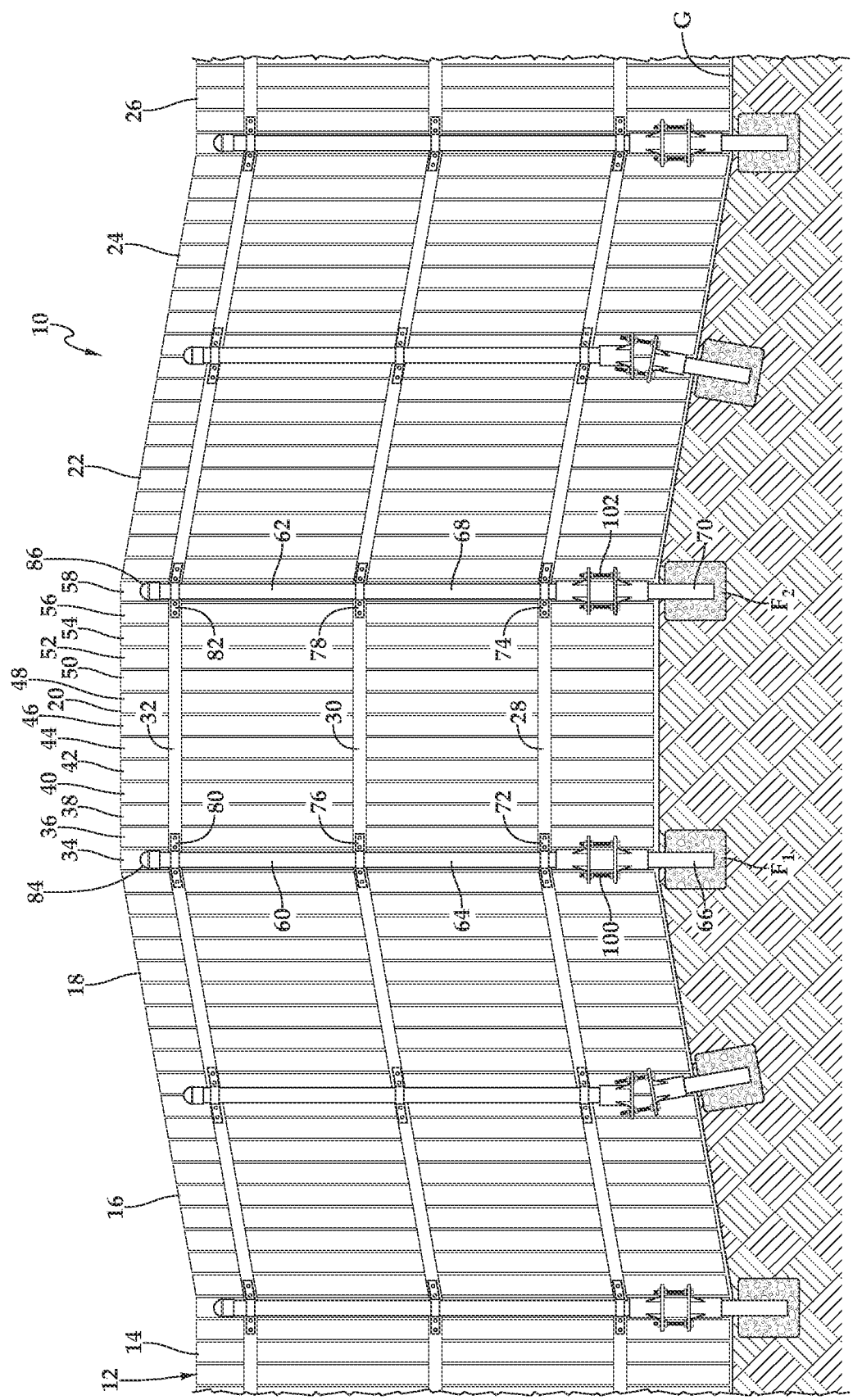
FIG. 1 is a schematic diagram of one embodiment of a fencing system that mitigates fence lean, according to the teachings presented herein.
Figure 2:
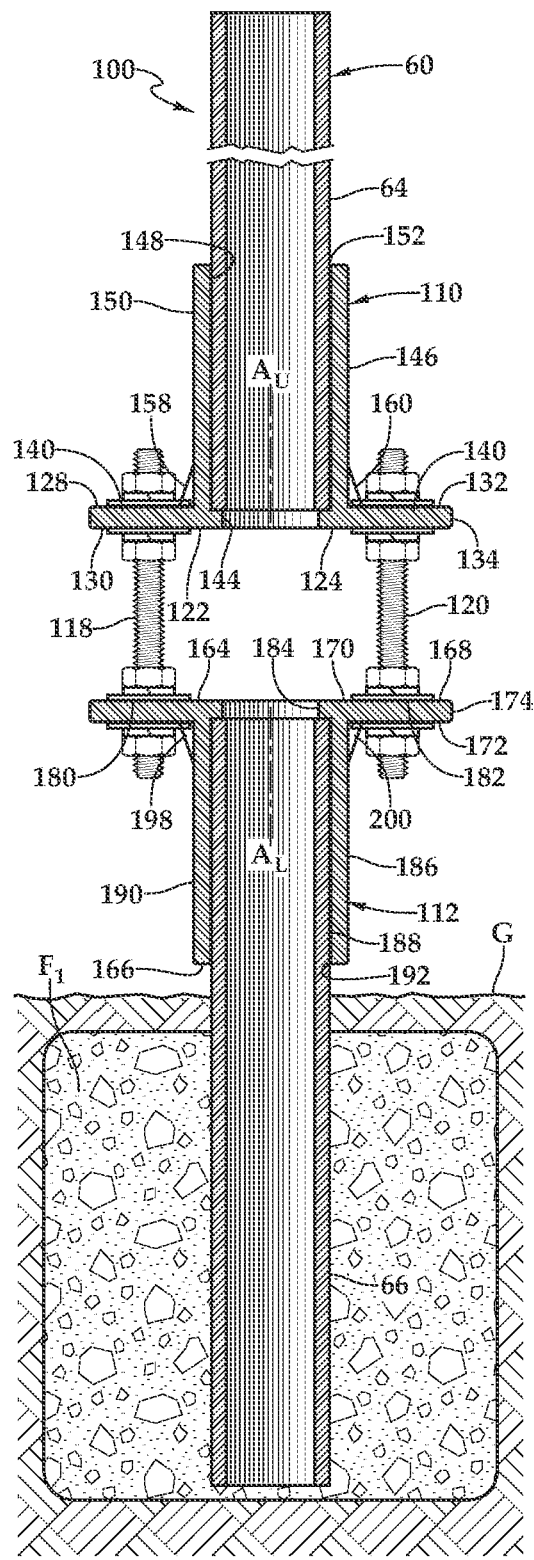
FIG. 2 is front elevation view, in cross-section, of one embodiment of a fence post leveling bracket assembly, according to the teachings presented herein.
Figure 3:
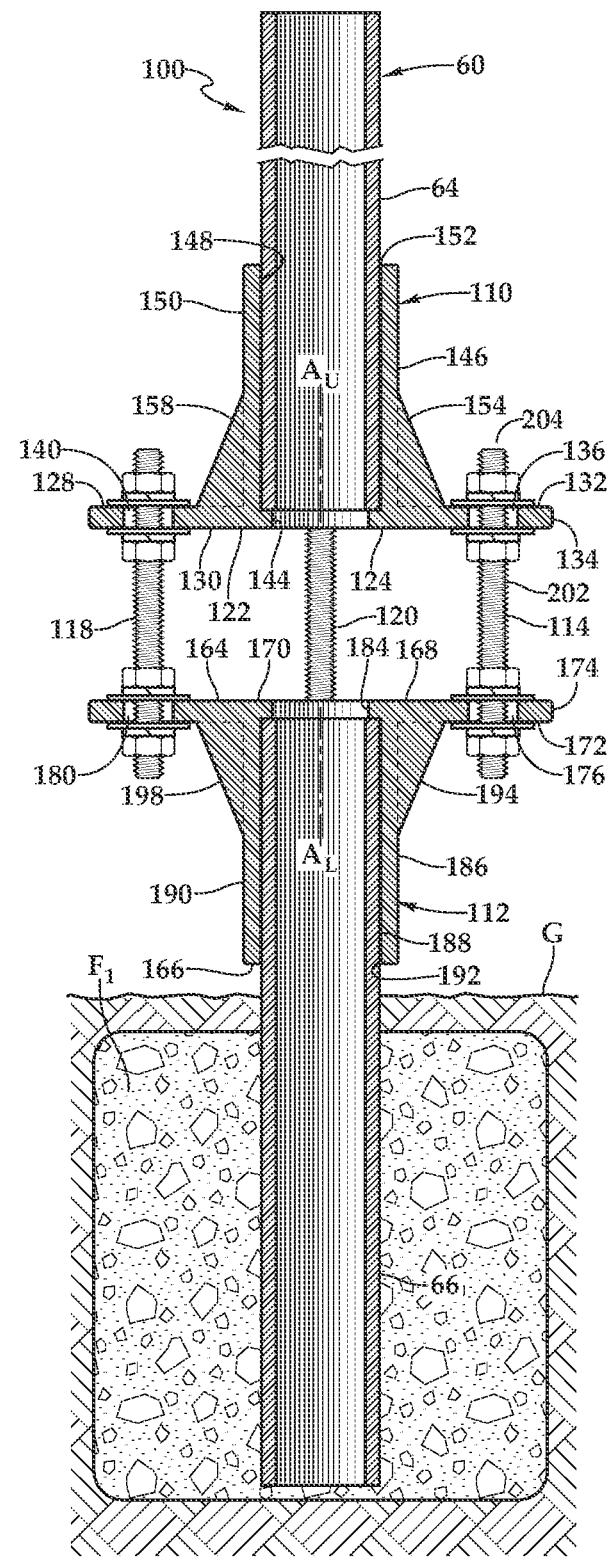
FIG. 3 is a lateral-offset elevation view, in cross-section, of the fence post leveling bracket assembly depicted in FIG. 2.

Referring initially to FIG. 1, therein is depicted a fencing system that mitigates fence lean with leveling, plumbing, and/or straightening, as required that is schematically illustrated and generally designated 10. A fence 12 includes fence panels 14, 16, 18, 20, 22, 24, 26. Each of the fence panels includes vertically spaced runners and each of the vertically spaced runners may be substantially horizontal to the ground G. Each of the fence panels also includes adjacent fence pickets, which may be vertically oriented and secured to the vertically spaced runners. Each of the fence panels 14, 16, 18, 20, 22, 24, 26 also includes two horizontally spaced fence posts, which may be shared by adjacent fence panels 14-26. A fence, such as the fence 12, with such a design is a popular choice to mark a perimeter, keep animals and children safe, and add privacy or beauty, for example.

By of further explanation, the fence panel 20 will now be discussed in additional detail. The fence panel 20 includes vertically spaced runners 28, 30, 32 with the vertically spaced runner 28 being closest to the ground G, the vertically spaced runner 30 being positioned above the vertically spaced runner 28, and the vertically spaced runner 32 being positioned above the vertically spaced runner 30. The fence panel 20 includes adjacent fence pickets 34, 36, 38, 40, 42, 44, 46, 48, 50, 52, 54, 56, 58. As shown, the adjacent fence pickets 34-58 are secured to the vertically spaced runners 28, 30, 32 and held above the ground G. Horizontally spaced fence posts 60, 62 frame the fence panel 20. As used herein, fence post encompasses various vertical structures, such as posts, piles, and poles, for example, that provide support to the fence. In particular, the fence post 60 includes an upper post portion 64 and a lower post portion 66. Similarly, the fence post 62 includes an upper post portion 68 and an lower post portion 70. The lower post portions 66, 70 respectively secure the fence posts 60, 62 in the ground G with foundations $F_1$, $F_2$.

In the illustrated embodiment, the vertically spaced runner 28 traverses the span between the horizontally spaced fence posts 60, 62 with a bracket 72 securing the vertically spaced runner 28 to the fence post 60 and a bracket 74 securing the vertically spaced runner 28 to the fence post 62. Likewise, the vertically spaced runner 30 traverses the span between the horizontally spaced fence posts 60, 62 with a bracket 76 securing the vertically spaced runner 30 to the fence post 60 and a bracket 78 securing the vertically spaced runner 30 to the fence post 62. In the same manner, the vertically spaced runner 32 traverses the span between the horizontally spaced fence posts 60, 62 with a bracket 80 securing the vertically spaced runner 32 to the fence post 60 and a bracket 82 securing the vertically spaced runner 32 to the fence post 62. A cap 84 is located at an upper end of the fence post 60 and a cap 86 is located at an upper end of the fence post 62. It should be appreciated that although a particular design and installation of the fencing system 10 and the fence 12 is depicted in FIG. 1, other designs and installations of fences are within the teachings of the fencing system presented herein. By way of example and not by way of limitation, the fence 12 may include a footer or a header.

Each of the fence posts 60, 62 serves as vertical support for a strong, structurally sound fence 12 that will stand against precipitation, high winds, excess ground moisture, and draught, for example. Over time, however, natural elements can cause even a structurally sound fence to lean as the part of the fence post below ground, whether embedded in concrete or not, often shifts due to ground movement. A fence post leveling bracket assembly 100 is interposed within the fence post 60 to provide selective adjustment that corrects for lean in an installed fence, such as the fence 12. Similarly, a fence post leveling bracket assembly 102 is interposed within the fence post 62 to mitigate against the impact of lean.

Referring now to FIG. 2 through FIG. 7, in one embodiment, the fence post leveling bracket assembly 100 includes an upper fence post bracket 110 and a lower fence post bracket 112 with adjustable vertical drift rods 114, 116, 118, 120 spanning a cavity 122 between the upper fence post bracket 110 and the lower fence post bracket 112. In some embodiments, each of the of adjustable vertical drift rods 114, 116, 118, 120 is open at each end such that each of the adjustable vertical drift rods 114, 116, 118, 120 independently locks and secures each of the upper fence post bracket 110 and the lower fence post bracket 112. The upper fence post bracket 110 includes a proximal end 124 and a distal end 126 with an upper vertical axis $A_U$ therethrough. An upper base plate 128 is located at the proximal end 124 and includes an interior surface 130, exterior surface 132, and an outer edge 134. Upper elongated slots 136, 138, 140, 142, which in some embodiments may be circular or circular openings in form, extend through the upper base plate 128 from the exterior surface 132 to the interior surface 130. As shown, the upper elongated slots 136, 138, 140, 142 may each be positioned near the outer edge 134. The upper base plate 128 may have an opening 144 therethrough. An upper socket member 146 is rigidly secured centrally to the exterior surface 132 of the upper base plate 128 and extends vertically therefrom to the distal end 126 of the upper fence post bracket 110. The upper socket member 146 may have an interior surface 148 and an exterior surface 150 with an opening 152 at the distal end 126. Triangular stiffener plates 154, 156, 158, 160 extend from the exterior surface 132 of the upper base plate 128 to the exterior surface 150 of the upper socket member 146 to provide additional support. In one embodiment, the triangular stiffener plate 154 is positioned between the upper elongated slot 136 and the upper socket member 146, the triangular stiffener plate 156 is positioned between the upper elongated slot 138 and the upper socket member 146, the triangular stiffener plate 158 is positioned between the upper elongated slot 140 and the upper socket member 146, and the triangular stiffener plate 160 is positioned between the upper elongated slot 142 and the upper socket member 146. As shown, the fence post 60 and, in particular, the upper post portion 68 of the fence post 60 is secured within the upper socket member 146 and extends therefrom. It should be appreciated that the positioning of the triangular stiffener plate 154 may vary from what is shown. By way of example and not by way of limitation, the triangular stiffener plate 156 may be shifted along the socket member 146, allowing the triangular stiffener plate 154 placement to be between any of the upper elongated slots 136, 138, 140, 142 and the socket member 146.

The lower fence post bracket 112 includes a proximal end 164 and a distal end 166 with a lower vertical axis $A_L$ therethrough. A lower base plate 168 is located at the proximal end 164 and includes an interior surface 170, exterior surface 172, and an outer edge 174. Lower elongated slots 176, 178, 180, 182 extend through the lower base plate 168 from the exterior surface 172 to the interior surface 170. As shown, the lower elongated slots 176, 178, 180, 182 may each be positioned near the outer edge 174. The lower base plate 168 may have an opening 184 therethrough. A lower socket member 186 is rigidly secured centrally to the exterior surface 172 of the lower base plate 168 and extends vertically therefrom to the distal end 166 of the lower fence post bracket 112. The lower socket member 186 may have an interior surface 188 and an exterior surface 190 with an opening 192 at the distal end 166. Triangular stiffener plates 194, 196, 198, 200 extend from the exterior surface 172 of the lower base plate 168 to the exterior surface 190 of the lower socket member 186 to provide additional support. In one embodiment, the triangular stiffener plate 194 is positioned between the lower elongated slot 176 and the lower socket member 186, the triangular stiffener plate 196 is positioned between the lower elongated slot 178 and the lower socket member 186, the triangular stiffener plate 198 is positioned between the lower elongated slot 180 and the lower socket member 186, and the triangular stiffener plate 200 is positioned between the lower elongated slot 182 and the lower socket member 186. As shown, the fence post 60 and, in particular, the lower post portion 66 of the fence post 60 is secured within the lower socket member 186 and extends therefrom.

As shown, the upper base plate 128 of the upper fence post bracket 110 faces the lower base plate 168 of the lower fence post bracket 112 with the cavity 122 therebetween. In one implementation, the upper fence post bracket 110 and the lower fence post bracket 112 have symmetry with symmetrical forms. The upper base plate 128 and the lower base plate 168 are, responsive to installation, above the ground G. As will be discussed in further detail hereinbelow, by having the upper base plate 128 and the lower base plate 168 above ground G, the cavity 122 is also above the ground G and thereby accessible for making various adjustments to the adjustable vertical drift rods 114, 116, 118, 120 to correct the lean in a fence, like the fence 12. In the illustrated embodiment, the adjustable vertical drift rods 114, 116, 118, 120 span the cavity 122 from the upper elongated slots 136, 138, 140, 142 to the lower elongated slots 176, 178, 180, 182. In particular, as shown, the upper elongated slots 136, 138, 140, 142 may be aligned with the lower elongated slots 176, 178, 180, 182. Further, as shown, the upper elongated slots 136, 138, 140, 142 and the lower elongated slots 176, 178, 180, 182 may be respectively positioned in a rectangular fashion 90 degrees apart.

Each of the adjustable vertical drift rods 114, 116, 118, 120 secure the upper fence post bracket 110 and the lower fence post bracket 112. To facilitate adjustment of each of the adjustable drift rods 114, 116, 118, 120, each of the adjustable drift rods 114, 116, 118, 120 have a sufficient length to define an intra-portion within the cavity 122 and an extra-portion outside of the cavity 122. By way of example, with respect to the adjustable drift rod 114, the adjustable drift rod includes an intra-portion 202 and an extra-portion 204. Further, the adjustable drift rods 114, 116, 118, 120 may include threaded fasteners, which may include threaded bolts with supporting hardware 208, which in some embodiments includes nuts 205, lock washers 207, and flat washers 209, for example. To illustrate this example, the adjustable drift rod 114 includes threaded fastener 206, which, in the illustrated embodiment, is depicted as a threaded rod or bolt with the supporting hardware 208, which, as shown, includes the nuts 205, the lock washers 207, and the flat washers 209. It should be appreciated that although particular configurations of the upper fence post bracket 110 and the lower fence post bracket 112 are depicted in FIG. 2 through FIG. 7, other configurations are within the teachings herein. By way of example, and not by way of limitation, the sizes and configurations of the upper base plate 128 and the lower base plate 168 as well as the upper fence post bracket 110 and the lower fence post bracket 112 to accommodate a range of sizes of fence posts, including various posts, piles, and poles.

Referring now to FIGS. 8 and 9A, the upper fence post bracket 110 and the lower fence post bracket 112 have a reference placement R where the upper base plate 128 is parallel to the lower base plate 168 and the upper vertical axis $A_U$ is aligned with the lower vertical axis $A_L$. Also, the upper fence post bracket 110 and the lower fence post bracket 112 have various deviated placements D where the upper base plate 128 is positioned in a nonparallel fashion to the lower base plate 168 and the upper vertical axis $A_U$ is positioned in non-alignment with the lower vertical axis $A_L$.

Over time, natural elements can cause even a structurally sound fence to lean. By way of example and not by way of limitation, lean may occur as the part of the fence post below ground, whether embedded in concrete or not, often leans as a result of ground movement. As shown in FIG. 8, such natural elements have caused the fence post 60 to lean, which in turn is causing the fence to lean.

As alluded, the upper fence post bracket 110 and the lower fence post bracket 112 may undergo selective above-ground, post-installation, foundation-independent transitioning from the reference placement R to one of the deviated placements D by adjusting the adjustable drift rods 114, 116, 118, 120 to have at least two distinct intra-portion lengths $L_1$, $L_2$. That is, the fence post leveling bracket assembly 100 is in a deviated placement D when the adjustable drift rods 114, 116, 118, 120 have at least two distinct intra-portion lengths $L_1$, $L_2$, as well as the upper base plate 128 having a nonparallel orientation to the lower base plate 168 and the upper vertical axis $A_U$ being positioned in non-alignment with the lower vertical axis $A_L$.

As also alluded, the upper fence post bracket 110 and the lower fence post bracket 112 may selectively above-ground, post-installation, foundation-independent transition from one of the deviated placements D to the reference placement R by adjusting the adjustable drift rods 114, 116, 118, 120 to have a uniform intra-portion length, $L_3$. That is, the fence post leveling bracket assembly 100 is in a reference placement R when the adjustable drift rods 114, 116, 118, 120 have an intra-portion length $L_3$, as well as the upper base plate 128 being parallel to the lower base plate 168 and the upper vertical axis $A_U$ being in alignment with the lower vertical axis $A_L$. As shown, by comparing FIG. 8 to FIG. 9A, the fence post leveling bracket assembly 100 transitions by adjusting the adjustable drift rods 114, 116, 118, 120 from the reference placement R to the deviated placement D, which corrects the lean in the post vertically supporting the fence post leveling bracket assembly 100 and the associated fence, as represented by the plumb reading P on the level V.

Moreover, as previously discussed, such adjustments are made above-ground and may be performed pre-installation or post-installation, while keeping the fence substantially or fully intact, without regard to the type or form of the foundation or the way in which the fence is vertically supported to the ground G. In this manner, the fence post leveling bracket assembly 100 is foundation-independent. The adjustability of the upper post bracket 110 and the lower post bracket 112 by way of the adjustable drift rods 114, 116, 118, 120 permits changes to be made for translation, rotational angle, and cant angle within the fence post 60 itself, without regard to the foundation or vertical support mechanism and without disturbing the foundation or vertical support mechanism. As detailed herein, any required changes to correct for lean or other defects in the fence, may be made intra-fence post without disturbing the foundation or vertical support mechanism. Additionally, if required and as required, the height of a fence post may effectively be increased or decreased by adjusting the spacing between the upper post bracket 110 and the lower post bracket 112.

Referring now to FIG. 9B, as previously discussed, the upper fence post bracket 110 and the lower fence post bracket 112 may undergo selective above-ground, post-installation, foundation-independent transitioning from the reference placement R to one of the deviated placements D by adjusting the adjustable drift rods 114, 116, 118, 120 to have at least two distinct intra-portion lengths $L_1$, $L_2$. That is, the fence post leveling bracket assembly 100 is in a deviated placement D when the adjustable drift rods 114, 116, 118, 120 have at least two distinct intra-portion lengths $L_1$, $L_2$, as well as the upper base plate 128 having a nonparallel orientation to the lower base plate 168 and the upper vertical axis $A_U$ being positioned in non-alignment with the lower vertical axis $A_L$. As shown in FIG. 9B, in some embodiments, angled spacers 220 may be respectively positioned on the adjustable drift rods 114, 116 to assist with defining the deviated placement D. The angled spacers 220 may be used to eliminate the gap between the supporting hardware 208 or alternatively between the supporting hardware and the upper base plate 128 if the maximum minimum ratio of separation (maximum gap) is exceeded. It should be appreciated that other configurations of angled spacers are within the teachings presented herein.

Referring now to FIGS. 9C through 9G, as previously discussed, the upper fence post bracket 110 and the lower fence post bracket 112 may undergo selective above-ground, post-installation, foundation-independent transitioning from the reference placement R to one of the deviated placements D by adjusting the adjustable drift rods 114, 116, 118, 120 to have at least two distinct intra-portion lengths $L_1$, $L_2$. That is, as previously discussed, the fence post leveling bracket assembly 100 is in a deviated placement D when the adjustable drift rods 114, 116, 118, 120 have at least two distinct intra-portion lengths $L_1$, $L_2$, as well as the upper base plate 128 having a nonparallel orientation to the lower base plate 168 and the upper vertical axis $A_U$ being positioned in non-alignment with the lower vertical axis $A_L$. As shown in FIG. 9C, in some embodiments, angled spacers 220, 222, 224, 226 may be respectively positioned on the adjustable drift rods 114, 116 to assist with defining the deviated placement D. The angled spacers 220 may be used to eliminate the gap between the supporting hardware 208 or alternatively between the supporting hardware 208 and the lower base plate 168 if the maximum minimum ratio of separation (maximum gap) is exceeded. In this manner, a "true center" of the upper fence post bracket 110 and the lower fence post bracket 112 may be enabled, thereby providing vertical plumb and level position. It should be appreciated that other configurations of angled spacers are within the teachings presented herein.

Referring now to FIG. 9H, in some embodiments, the angled spacer 220 includes a body 222 having an opening through the center thereof. A surface 226, which may be a top or a bottom depending on the orientation of the angled spacer 220, has an angled face. A surface 228, which is the bottom or top depending on the orientation of the angled spacer, has a horizontal face. A sidewall 230 spans the distance between the surface 226 and the surface 228. With reference to FIG. 9D through FIG. 9H, in some operational embodiments, at least one of the upper fence post bracket 110 and the lower fence post bracket 112 have pairs of angled spacers 220 associated with the applicable spaced upper elongated slots 136, 138, 140, 142 and the spaced lower elongated slots 176, 178, 180, 182. Each angled spacer 220 of the has the surface 226, which is the angled face, against the at least one of the upper fence post bracket 110 and the lower fence post bracket 112. In this manner, the angled spacers 220 compensate for the deviated placement, which may be angled displacement.

Figure 11:
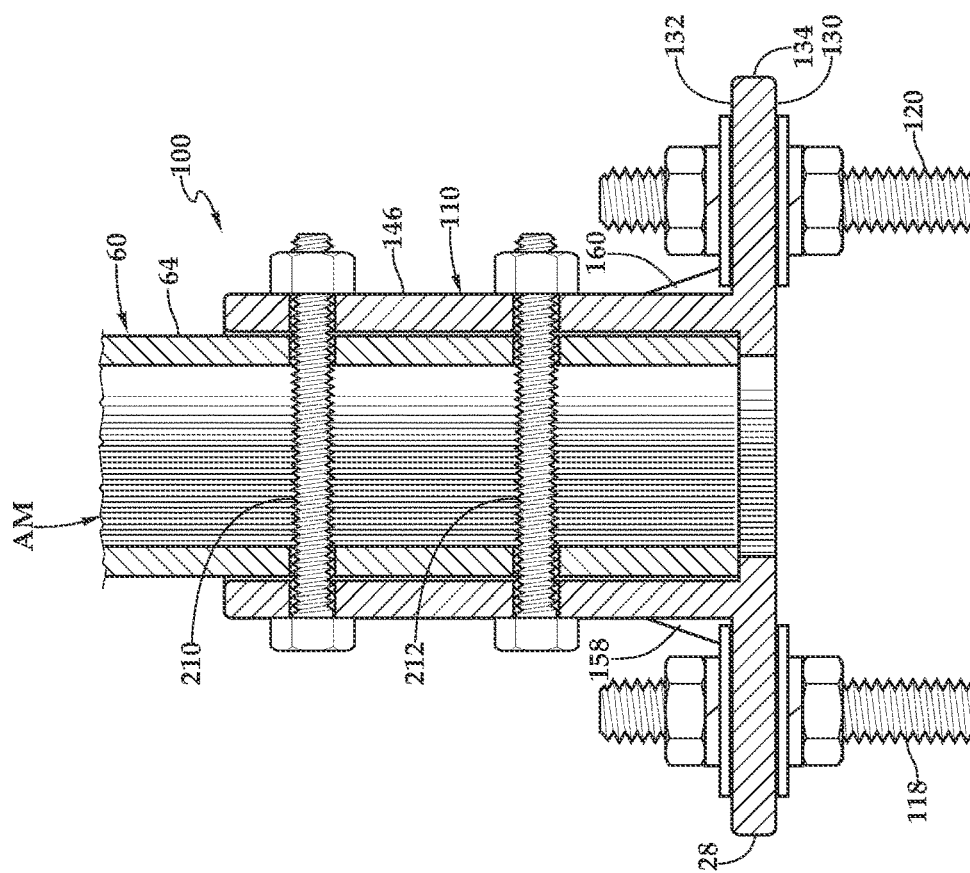
FIG. 11 is a front elevation view, in cross-section, depicting one embodiment of an after-market configuration of the fence post leveling bracket assembly depicted in FIG. 2.
Figure 10:
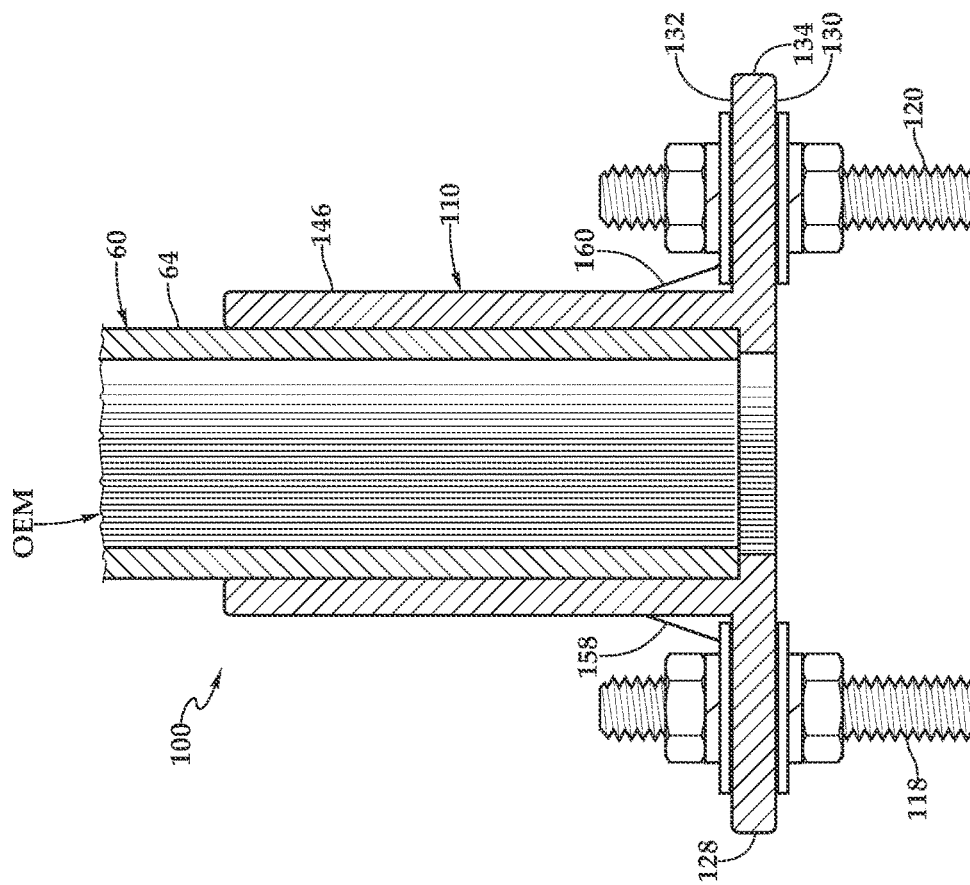
FIG. 10 is a front elevation view, in cross-section, depicting one embodiment of an original-equipment-manufacturer configuration of the fence post leveling bracket assembly depicted in FIG. 2.

Referring now to FIGS. 10 and 11, the fence post leveling bracket assembly 100 may have an original-equipment-manufacturer configuration OEM or an after-market AM configuration. In the original-equipment-manufacturer configuration OEM, the lower post portion 66 is integral with the lower socket member 186 and the lower post portion 66 may extend downward from the lower fence post bracket 112. The upper post portion 64 is integral with the upper socket member 146 and the upper post portion 64 extends upward from the upper fence post bracket 110. On the other hand, with many existing fences that are exhibiting lean, the fence post leveling bracket assembly 100 may be installed in an after-market configuration AM where the fence post leveling bracket assembly 100 is interposed into an existing fence post, such as, for purposes of explanation, the fence post 60. The fence post 60 may be cut to achieve the after-market configuration AM. In the after-market configuration AM, the lower post portion 66 is secured to the lower socket member 186 and the lower post portion 66 extends downward from the lower fence post bracket 112. The upper post portion 64 is secured to the upper socket member 146 and the upper post portion 64 extends upward from the upper fence post bracket 110. In one implementation, fasteners 210, 212 may utilized to secure the upper post portion 64 to the upper socket member 146. It should be appreciated that the fence post leveling bracket assembly 100 may alternatively be utilized with other vertically or horizontally oriented fencing systems and fencing components as well as vertical support structures like utility poles, for example. By way of example and not by way of limitation, the fence post leveling bracket assembly 100 may be utilized with aluminum fencing, bamboo fencing, chain link fencing, farm fencing, picket fencing, wood fencing, wrought iron fencing, street lights, light poles, telephone poles, and utility poles.

As presented hereinabove, the fencing system with the use of one or more fence post bracket assemblies provides upper and lower fence post brackets with a range of sizes that account for integration into any dimension post or post-alternative, including piles and poles, for example. As the fence ages and lean or other defects develop, the fence post bracket assemblies may be adjusted intra-fence post to provide an in-post solution that is foundation and vertical support mechanism independent, while being above-ground. In this manner, the foundation and vertical support mechanisms of the fence under adjustment and correction do not have to be adjusted or interfaced. The foundation-independent solution, which is also an in-post solution, avoids the problems, in terms of time and cost, of having to interface with a foundation of the fence posts of a fence to correct lean.

Figure 12:
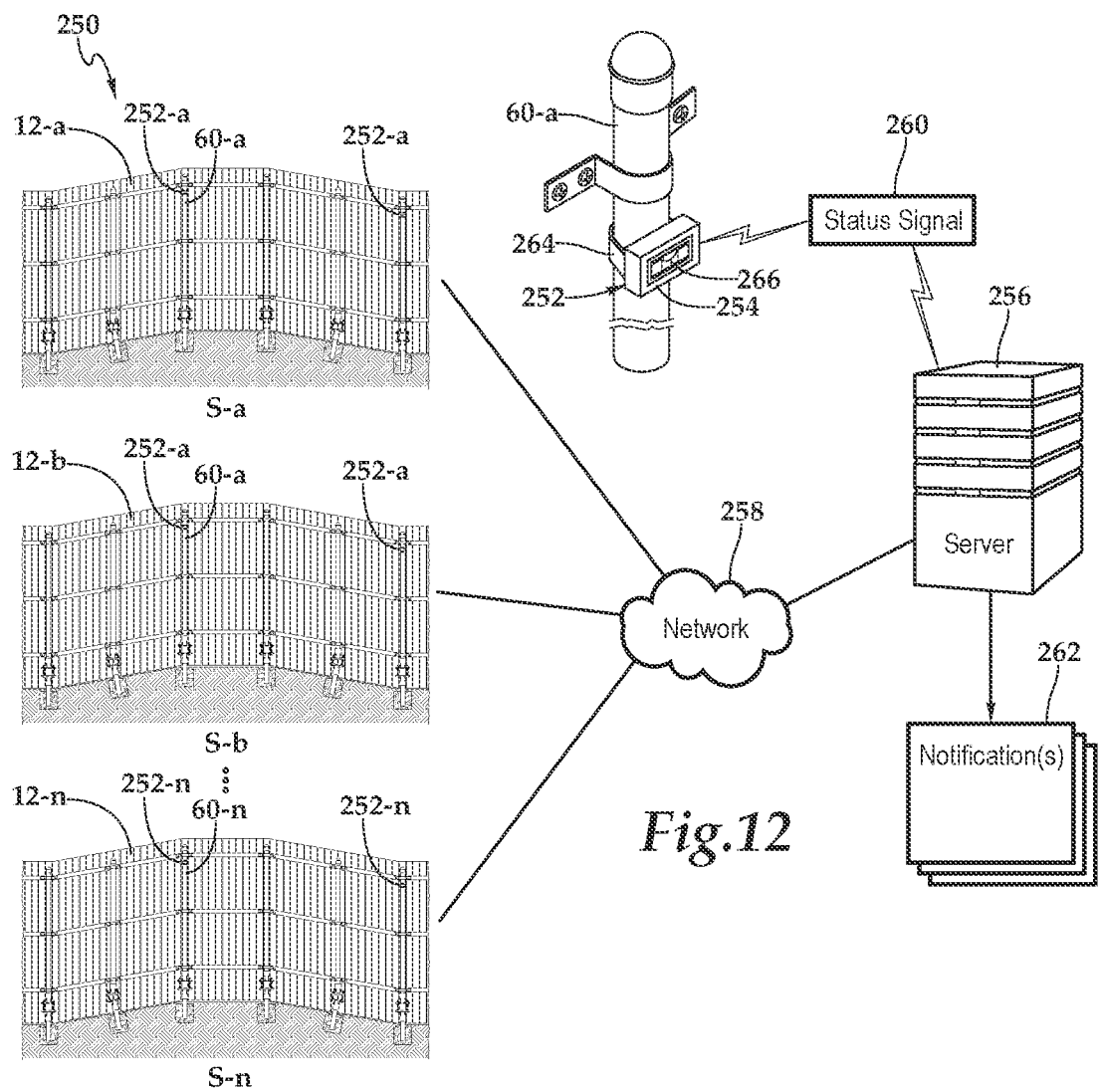
FIG. 12 depicts a schematic process flow diagram of one embodiment of a fencing system, including monitoring units, that mitigates fence lean, according to the teachings presented herein.

FIG. 12 depicts another embodiment of a fencing system 250 that mitigates fence lean. Fences 12-a, 12-b, . . . , 12-n are located at different sites S-a, S-b, . . . , S-n. Each of the fences 12-a, 12-b, 12-n has at least one monitoring unit 252 having a housing 254. The monitoring units are respectively labeled 252-a, 252-b, . . . , 252-n and releasably secured to fence posts 60-a, 60-b, 60-n. Each of the monitoring units 252 are disposed in wireless communication with a server 256 via a network 258. Each of the monitoring units 252-a, 252-b, . . . , 252-n monitors lean of the respective fence posts 60a, 60-b, . . . , 60-n and responsive to detecting a lean, the appropriate monitoring unit 252 sends a status signal 260 to the server 256 indicating such. The server 256 may then send the appropriate notification or notifications 262 to a fence owner, property manager, or fence repair company, for example.

Additionally, the housing 254 may be secured to a fence post, such as the fence post 60-a, with an adjustable band 264 or other fastening mechanism, such as a magnet. Such a fastening mechanism, like the adjustable band 264, provides for the monitoring unit 252 being pivoted around the fence post 60-a to a desired location and position. A window 260 may be located at the housing 254 to provide visibility into the reading provided by the monitoring unit 252, including reading a manual option (see FIG. 13) and/or lean circuitry (see FIG. 13). The window 260 may located at a front or underside, or in one implementation both the front and underside, of the housing 256. By having the window 260 at least on the underside of the housing 256, a fencing professional or do-it-yourself fence installer may view the reading during an installation or adjustment.

Figure 13:
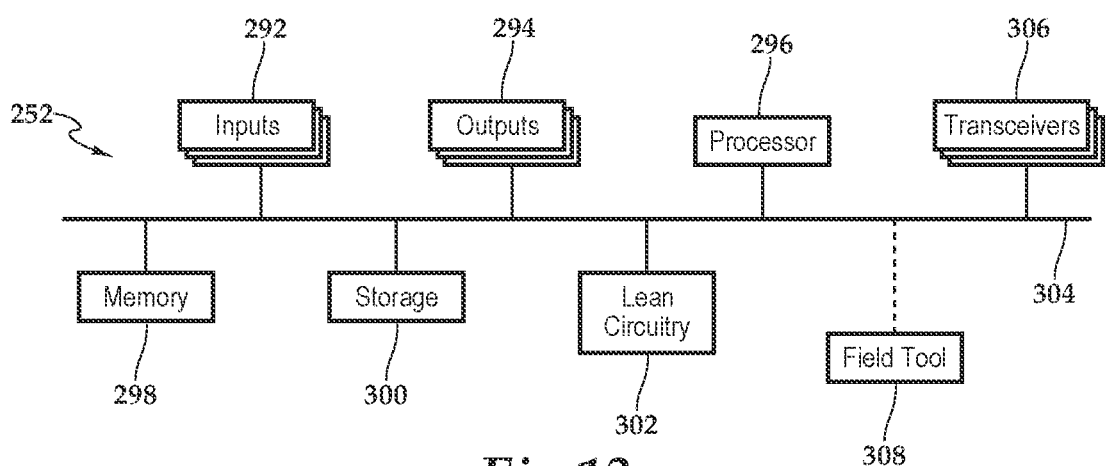
FIG. 13 is a functional block diagram depicting one embodiment of the monitoring unit presented in FIG. 12.

FIG. 13 depicts one embodiment of the monitoring unit 252. Within the housing 254, inputs 292, outputs 294, processor 296, memory 298, storage 300, and lean circuitry 302 are interconnected by a bus architecture 304 within a mounting architecture. The processor 296 may process instructions for execution within the computing device, including instructions stored in the memory 298 or in the storage 300. The memory 298 stores information within the computing device. In one implementation, the memory 298 is a volatile memory unit or units. In another implementation, the memory 298 is a non-volatile memory unit or units. The storage 300 provides capacity that is capable of providing mass storage for the monitoring unit 252. The various inputs 292 and outputs 294 provide connections to and from the computing device, wherein the inputs 292 are the signals or data received by the monitoring unit 252, and the outputs 294 are the signals or data sent from the monitoring unit 252. The lean circuitry 302 may include a digital plumb, or an accelerometer and gyroscope sensor, for example, with a GPS module for date/time information and well as locationing information.

Multiple transceivers 306 may be associated with the monitoring unit 250 and communicatively disposed with the bus 304. As shown the transceivers 306 may be internal, external, or a combination thereof to the housing. Further, the transceivers 306 may be a transmitter/receiver, receiver, or an antenna for example. Communication with the server 256 may be enabled by a variety of wireless methodologies employed by the transceivers 306, including 802.11, 802.15, 802.15.4, 3G, 4G, Edge, Wi-Fi, ZigBee, near field communications (NFC), Bluetooth low energy and Bluetooth, for example. Also, infrared (IR) may be utilized. It should further be appreciated that although multiple transceivers 306 are depicted in FIG. 13, a single transceiver may be utilized, and a single transceiver is within the teachings presented herein. Additionally, as mentioned, the monitoring unit 252 may include a field tool 308, such as a form of manually read digital or analog read level, that may be accessed in the field at the site for on-site reading.

The memory 298 and storage 300 are accessible to the processor 296 and include processor-executable instructions that, when executed, cause the processor 296 to execute a series of operations. With respect to first processor-executable instructions, the processor 296 is caused to monitor the lean of the fence post with the lean circuitry 302. The processor-executable instructions then send a status signal to the server 256 to report the lean or, in response, to a particular lean threshold being measured, for example. The monitoring may be continuous or intermittent. With respect to second processor-executable instructions, the processor 296 is caused to receive a status inquiry from the server. The processor 296 is then caused to monitor the lean of the fence post with the lean circuitry 302 and send a status signal to the server. It should be appreciated that the monitoring unit 252 may be contained within any of the caps, such as caps 84, 86 or within any of the fence posts, such as fence posts 60, 62, or other location, depending on the particular specifications of the project.

The processor-executable instructions presented hereinabove include, for example, instructions and data which cause a general-purpose computer, special purpose computer, or special purpose processing device to perform a certain function or group of functions. Processor-executable instructions also include program modules that are executed by computers in stand-alone or network environments. Generally, program modules include routines, programs, components, data structures, objects, and the functions inherent in the design of special-purpose processors, or the like, that perform particular tasks or implement particular abstract data types. Processor-executable instructions, associated data structures, and program modules represent examples of the program code means for executing steps of the systems and methods disclosed herein. The particular sequence of such executable instructions or associated data structures represents examples of corresponding acts for implementing the functions described in such steps and variations in the combinations of processor-executable instructions and sequencing are within the teachings presented herein.

Figure 14:
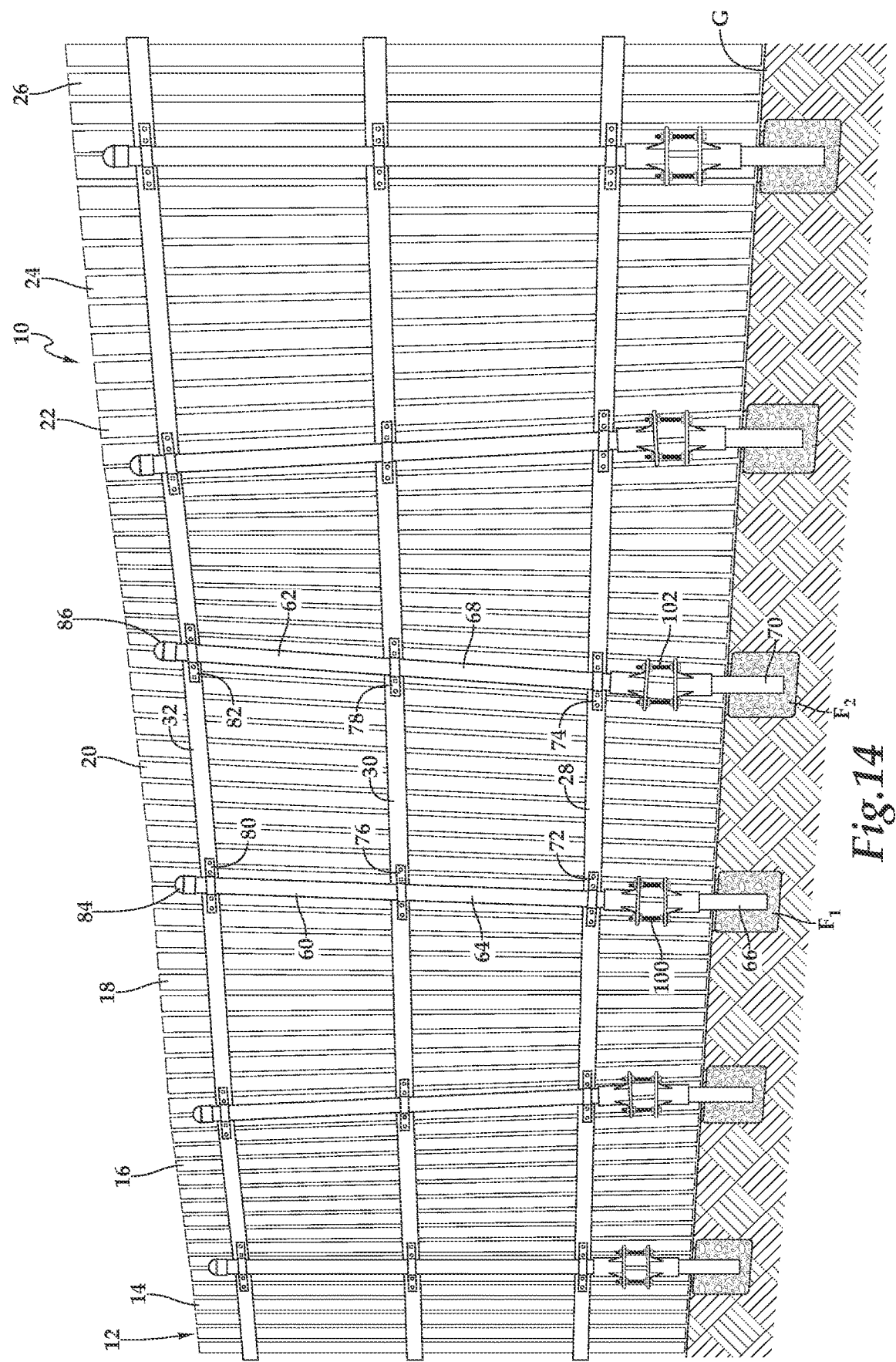
FIG. 14 is a schematic diagram of the fencing system depicted in FIG. 1 that mitigates a different form of fence lean.

Referring now to FIG. 14 and FIG. 15A, the fencing system 10 may mitigate and correct various forms of fence lean, such as an undulating ground as shown in FIG. 1 or undulating fence panels above the ground as shown in FIG. 14 and FIG. 15A. The fencing system 10 mitigates and corrects this form of fence lean. As shown, each of the fence posts 60, 62 serve as vertical support for a strong, structurally sound fence 12 that will stand against precipitation, high winds, excess ground moisture, and draught. Over time, however, natural elements can cause even a structurally sound fence to lean as shown in FIG. 14. The fence post leveling bracket assembly 100 is interposed within the fence post 60 to provide selective adjustment that corrects for lean in an installed fence, such as the fence 12. Similarly, the fence post leveling bracket assembly 102 is interposed within the fence post 62 to mitigate against the impact of lean. By adjusting the fence post bracket assemblies 100, 102 and the other fence post bracket assemblies, the lean in the fence 12 may be corrected as shown in FIG. 15B.

Referring now to FIGS. 16A and 16B, a cover assembly 230 may be placed over the fence post leveling bracket assembly 100. In some embodiments, the cover assembly 230 includes an outer protective cover 232 which rests on a linkage member skeleton subassembly 234. The cover assembly 230 may be manufactured of galvanized steel, plastic, or composite, for example. The cover assembly 230 may be clipped-on to the fence post 60 to provide enhanced environmental protection from wind, rain, and the like to the fence post leveling bracket assembly 100.

Relative terms, such as, but not limited to, "upper," "lower," "below," "horizontal," or "vertical," may be used herein to describe one element's relationship to another element as illustrated in the figures. Such relative terms are intended to encompass different orientations of the device in addition to the orientation depicted in the figures. Further, the order of execution or performance of the methods and process flows illustrated and described herein is not essential, unless otherwise specified. That is, elements of the methods and process flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A fence post leveling bracket assembly for a fence having a post vertically supported in the ground, the fence post leveling bracket assembly comprising:

an upper fence post bracket including an upper base plate having a plurality of spaced upper elongated slots extending therethrough, the plurality of spaced upper elongated slots being circular openings, the upper fence post bracket including an upper socket member rigidly secured centrally to the upper base plate and extending vertically therefrom, the upper socket member being open at a distal end thereof, the upper socket member being sized to mate with the post;

a lower fence post bracket including a lower base plate having a plurality of spaced lower elongated slots extending therethrough, the plurality of spaced lower elongated slots being circular openings, the lower fence post bracket including a lower socket member rigidly secured centrally to the lower base plate and extending vertically therefrom, the lower socket member being open at a distal end thereof, the lower socket member being sized to mate with the post;

the upper base plate of the upper fence post bracket facing the lower base plate of the lower fence post bracket with a cavity therebetween;

the upper base plate and the lower base plate being, responsive to installation, above the ground;

a plurality of adjustable vertical drift rods spanning the cavity from the plurality of spaced upper elongated slots to the plurality of spaced lower elongated slots, each of the plurality of adjustable vertical drift rods being open at each end, each of the plurality of adjustable vertical drift rods independently locking and securing each of the upper fence post bracket and the lower fence post bracket;

each of the plurality of adjustable drift rods having an intra-portion within the cavity and an extra-portion outside of the cavity;

the upper fence post bracket and the lower fence post bracket having a reference placement where the upper base plate is parallel to the lower base plate;

the upper fence post bracket and the lower fence post bracket having a plurality of deviated placements where the upper base plate is nonparallel to the lower base plate;

the upper fence post bracket and the lower fence post bracket selectively above-ground, post-installation, foundation-independent transitioning from the reference placement to one of the plurality of deviated placements by adjusting the plurality of adjustable drift rods to have at least two distinct intra-portion lengths;

the upper fence post bracket and the lower fence post bracket selectively above-ground, post-installation, foundation-independent transitioning from one of the plurality of deviated placements to the reference placement by adjusting the plurality of adjustable drift rods to have a uniform intra-portion length; and at least one of the upper fence post bracket and the lower fence post bracket having a plurality of pairs of angled spacers associated with the applicable spaced upper elongated slots and spaced lower elongated slots, each angled spacer of the plurality of pairs of angled spacers having an angled face and a horizontal face, the angled face being against the at least one of the upper fence post bracket and the lower fence post bracket.

2. The fence post leveling bracket assembly as recited in claim 1, wherein the upper fence post bracket and the lower fence post bracket further comprise symmetry.

3. The fence post leveling bracket assembly as recited in claim 1, wherein the plurality of spaced upper elongated slots further comprises alignment with the plurality of spaced lower elongated slots.

4. The fence post leveling bracket assembly as recited in claim 1, wherein the plurality of spaced upper elongated slots further comprises four spaced upper elongated slots positioned in a rectangular fashion 90 degrees apart.

5. The fence post leveling bracket assembly as recited in claim 1, wherein the plurality of spaced lower elongated slots further comprises four spaced lower elongated slots positioned in a rectangular fashion 90 degrees apart.

6. The fence post leveling bracket assembly as recited in claim 1, further comprising an original-equipment-manufacturer configuration wherein:
a lower post portion being integral with the lower socket member, the lower post portion extending downward from the lower fence post bracket; and
an upper post portion being integral with the upper socket member, the upper post portion extending upward from the upper fence post bracket.

7. The fence post leveling bracket assembly as recited in claim 1, further comprising an after-market configuration wherein:
a lower post portion being secured to the lower socket member, the lower post portion extending downward from the lower fence post bracket; and
an upper post portion being secured to the upper socket member, the upper post portion extending upward from the upper fence post bracket.

8. The fence post leveling bracket assembly as recited in claim 1, wherein the plurality of adjustable vertical drift rods further comprises a plurality of threaded fasteners.

9. The fence post leveling bracket assembly as recited in claim 8, wherein the plurality of threaded fasteners further comprises a plurality of bolts with supporting hardware, nuts, lock washers, and flat washers.

10. A fencing system comprising:
a fence having a plurality of fence panels, each of the plurality of fence panels including a plurality of vertically spaced runners, each of the vertically spaced runners being substantially horizontal to the ground;
each of the plurality of fence panels including a plurality of adjacent fence pickets, each of the plurality of adjacent fence pickets being vertically oriented, each of the plurality of adjacent fence pickets being secured to the plurality of vertically spaced runners;
each of fence panels including first and second horizontally spaced fence posts; and
each of the first and second horizontally spaced fence posts including a fence post leveling bracket assembly for a post vertically supported in the ground, the fence post leveling bracket assembly comprising:
an upper fence post bracket including an upper base plate having a plurality of spaced upper elongated slots extending therethrough, the upper fence post bracket including an upper socket member rigidly secured centrally to the upper base plate and extending vertically therefrom, the upper socket member being open at a distal end thereof, the upper socket member securing the fence post thereat;
a lower fence post bracket including a lower base plate having a plurality of spaced lower elongated slots extending therethrough, the lower fence post bracket including a lower socket member rigidly secured centrally to the lower base plate and extending vertically therefrom, the lower socket member being open at a distal end thereof, the lower socket member securing a vertically supporting post thereat, the vertically supporting post extending into the ground;
the upper base plate of the upper fence post bracket facing the lower base plate of the lower fence post bracket with a cavity therebetween;
the upper base plate and the lower base plate being, responsive to installation, above the ground;
a plurality of adjustable vertical drift rods spanning the cavity from the plurality of spaced upper elongated slots to the plurality of spaced lower elongated slots, each of the plurality of adjustable vertical drift rods securing the upper fence post bracket and the lower fence post bracket theretogether;
each of the plurality of adjustable drift rods having an intra-portion within the cavity and an extra-portion outside of the cavity;
the upper fence post bracket and the lower fence post bracket having a reference placement where the upper base plate is parallel to the lower base plate;
the upper fence post bracket and the lower fence post bracket having a plurality of deviated placements where the upper base plate is nonparallel to the lower base plate;
the upper fence post bracket and the lower fence post bracket selectively above-ground, post-installation, foundation-independent transitioning from the reference placement to one of the plurality of deviated placements by adjusting the plurality of adjustable drift rods to have at least two distinct intra-portion lengths; and
the upper fence post bracket and the lower fence post bracket selectively above-ground, post-installation, foundation-independent transitioning from one of the plurality of deviated placements to the reference placement by adjusting the plurality of adjustable drift rods to have a uniform intra-portion length.

11. The fence post leveling bracket assembly as recited in claim 10, wherein the upper fence post bracket and the lower fence post bracket further comprise symmetry.

12. The fence post leveling bracket assembly as recited in claim 10, wherein the plurality of spaced upper elongated slots further comprises alignment with the plurality of spaced lower elongated slots.

13. The fence post leveling bracket assembly as recited in claim 10, wherein the plurality of spaced upper elongated slots further comprises four spaced upper elongated slots positioned in a rectangular fashion 90 degrees apart.

14. The fence post leveling bracket assembly as recited in claim 10, wherein the plurality of spaced lower elongated slots further comprises four spaced lower elongated slots positioned in a rectangular fashion 90 degrees apart.

15. The fence post leveling bracket assembly as recited in claim 10, wherein the plurality of adjustable vertical drift rods further comprises a plurality of threaded fasteners.

16. The fence post leveling bracket assembly as recited in claim 15, wherein the plurality of threaded fasteners further comprises a plurality of bolts with supporting hardware, nuts, lock washers, and flat washers.

17. A fence post bracket system for a fence having a post vertically supported in the ground, the fence post bracket system comprising:

an upper fence post bracket including an upper base plate having a plurality of spaced upper elongated slots extending therethrough, the upper fence post bracket including an upper socket member rigidly secured centrally to the upper base plate and extending vertically therefrom, the upper socket member being open at a distal end thereof, the upper socket member securing the fence post thereat, the fence post extending upward from the upper socket;

a lower fence post bracket including a lower base plate having a plurality of spaced lower elongated slots extending therethrough, the lower fence post bracket including a lower socket member rigidly secured centrally to the lower base plate and extending vertically therefrom, the lower socket member being open at a distal end thereof, the lower socket member securing vertically supporting post thereat, the vertically supporting post extending into the ground;

the upper base plate of the upper fence post bracket facing the lower base plate of the lower fence post bracket with a cavity therebetween;

the upper base plate and the lower base plate being, responsive to installation, above the ground;

a plurality of adjustable vertical drift rods spanning the cavity from the plurality of spaced upper elongated slots to the plurality of spaced lower elongated slots, each of the plurality of adjustable vertical drift rods securing the upper fence post bracket and the lower fence post bracket theretogther;

each of the plurality of adjustable drift rods having an intra-portion within the cavity and an extra-portion outside of the cavity;

the upper fence post bracket and the lower fence post bracket having a reference placement where the upper base plate is parallel to the lower base plate;

the upper fence post bracket and the lower fence post bracket having a plurality of deviated placements where the upper base plate is nonparallel to the lower base plate;

the upper fence post bracket and the lower fence post bracket selectively above-ground, post-installation, foundation-independent transitioning from the reference placement to one of the plurality of deviated placements by adjusting the plurality of adjustable drift rods to have at least two distinct intra-portion lengths;

the upper fence post bracket and the lower fence post bracket selectively above-ground, post-installation, foundation-independent transitioning from one of the plurality of deviated placements to the reference placement by adjusting the plurality of adjustable drift rods to have a uniform intra-portion length; and a monitoring unit secured to the fence post, the monitoring unit including a housing securing a processor, lean circuitry, a wireless transceiver, memory, and storage therein;

a busing architecture communicatively interconnecting the processor, the lean circuitry, the wireless transceiver, the memory, and the storage; and the lean circuitry monitoring lean of the fence post and responsive to detecting a lean, sending a status signal.

18. The fence post bracket system as recited in claim 17, wherein the lean circuitry further comprises a digital plumb.

19. The fence post bracket system as recited in claim 17, wherein the lean circuitry further comprises an accelerometer and gyroscope sensor.

20. The fence post bracket system as recited in claim 17, wherein the lean circuitry further comprises a GPS module.

* * * * *